Nov. 16, 1971 S. CHOLMAR 3,619,862

THERMOFORMING PLUG ASSEMBLY

Filed Dec. 23, 1968

*INVENTOR.*
SIDNEY CHOLMAR

BY *Michael J. Murphy*

ATTORNEY.

United States Patent Office 3,619,862
Patented Nov. 16, 1971

3,619,862
THERMOFORMING PLUG ASSEMBLY
Sidney Cholmar, Bloomfield, Conn., assignor to
Monsanto Company, St. Louis, Mo.
Filed Dec. 23, 1968, Ser. No. 786,282
Int. Cl. B29c 1/00
U.S. Cl. 18—19 P                    4 Claims

ABSTRACT OF THE DISCLOSURE

A plug assembly for use in thermoforming containers which includes plug sections mounted on a shaft portion adapted to accommodate different plug configurations to simplify tooling changes so that containers of different sizes and shapes may be formed at reduced cost.

---

The present invention relates to apparatus for forming plastic articles and more particularly to an apparatus for forming articles from a heated sheet of thermoplastic material.

A conventional method for producing hollow articles from thermoplastic sheet is to heat the sheet to a suitable deformation temperature, position it between a mold having a cavity and a mating plug or plunger of generally similar dimensions to that of the cavity and move the plunger against the sheet and into the cavity to draw or stretch deform a portion of the sheet into the mold to at least partially form the hollow plastic article. Commonly, a fluid pressure differential is then exerted against the thus drawn sheet portion to expand it wholly against the walls of the cavity to complete formation of the article.

In high speed, large volume installations, many of these articles are made during a single cycle of the forming equipment by providing a large number of such plunger and mold components in each forming station.

A major cost factor in molding articles in this manner is the recurring loss in production because of the rather extensive downtime of the equipment incurred for each product change on the forming line. Ordinarily a tooling change in switching from one product to another involves mounting a set of forming plugs on a support manifold prior to shutdown of the production line, removal of the tooling to be changed during the shutdown, setting the new tooling in place and aligning each individual plug opposite its mating mold cavity. This cumbersome procedure substantially increases the unit cost of each article in a molding operation which is generally dependent for profit on high volume, low cost operating techniques.

Now there has been developed a novel thermoforming plug assembly which substantially reduces the rather expensive manner of operating according to known prior art techniques mentioned above.

Accordingly it is an object of this invention to provide a thermoforming plug assembly to facilitate low cost production of hollow articles of different shapes.

It is another object of this invention to reduce the cost of forming articles from thermoplastic sheet in high speed, mass production operations.

It is a further object of this invention to materially reduce the complexity of tooling changes and the number of tooling components required in a thermoforming production line which must accomodate more than one product.

A further object of this invention is to provide a thermoforming plug assembly having a molding surface which can be readily changed without dismantling the remainder of the assembly.

Other objects of this invention will in part be obvious and will in part appear hereinafter.

These and other objects are accomplished by providing a plug assembly for use in forming plastic containers of different sizes from thermoplastic sheet material, comprising a shaft portion adapted to accommodate different size plugs, forming plugs for the different sized containers adapted to be removably mounted on the shaft portion, each of the plugs having a contoured surface for shaping at least a portion of a container from the sheet material, means associated with the shaft portion for heating the plug assembly, and means for securing the plugs to the shaft portion so that the plugs may be readily placed on and removed from the receptacle.

In describing the overall invention, reference will be made to the accompanying drawings in which.

Figure 1:
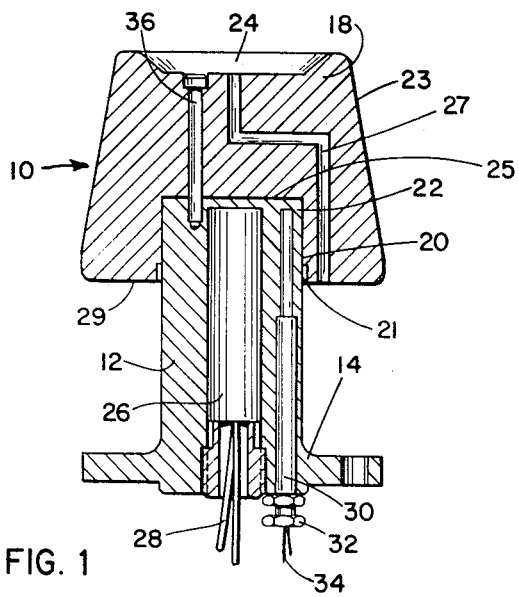
FIG. 1 is a central, vertical section of the apparatus of the present invention.
Figure 3:
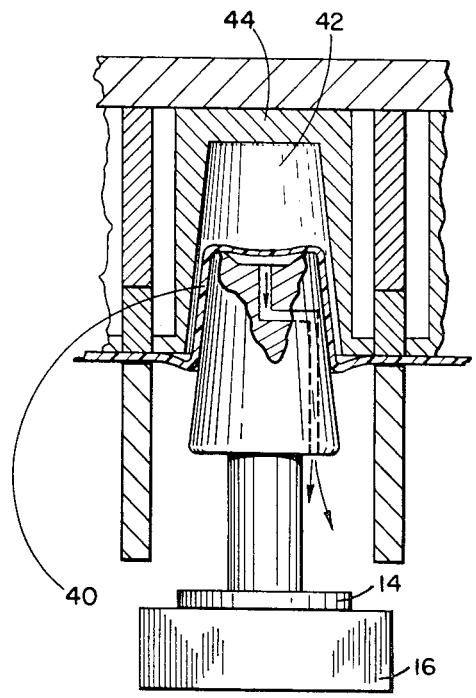
FIG. 3 is a schematic, vertical view showing formation of a container utilizing apparatus similar to that apparatus of FIG. 1.

With reference to the drawings, wherein identical numerals refer to identical parts, there is shown in FIG. 1, a thermoforming plug assembly 10 for use in forming containers of different sizes from thermoplastic sheet material. Assembly 10 comprises cylindrical shaft portion 12 having a lower flange 14 by means of which shaft portion 12 may be mounted on a suitable support manifold 16 (FIG. 3). Manifold 16 is connected by suitable means to a reciprocatably mounted support plate (not shown). Assembly 10 further comprises forming plug 18 having a pocket 20 in its trailing end adapted to accept the leading end 22 of cylindrical shaft portion 12 in the manner indicated in FIG. 1. Plug 18 may have a counter bore 21 cut in the surface of pocket 20 and extending upwardly a short distance from lower face 29. This counter bore serves to facilitate rather rapid alignment of shaft portion 12 with the pocket 20 of plug 18. The clearance between the surface of the shaft portion and that of the pocket of the plug, when assembled, is on the order of 0.001–0.003 in. whereas that between the surface of the shaft portion and the surface of the plug at counter bore 21 is on the order of 0.003–0.005 in.

Plug 18 has a contoured outer surface 23 for shaping at least a portion of a container from thermoplastic sheet material. Plug 18 may have its leading end indented at 24 to conform generally to the shape of a conical base portion of a container to be formed with the apparatus. This indentation is optional, and obviously the top face of the plug may be flat, convex upwardly etc. Plug 18, as shown, is frusto-conical in overall shape.

Assembly 10 includes means associated with shaft portion 12 for heating the plug assembly, and specifically for heating forming plug 18 to avoid chilling and setting the plastic with which it comes in contact during the drawing thereof. These means comprise an electrical resistance cartridge heater 26 inserted in a bore in shaft portion 12. However, the heating means could be located in manifold 16 on which one or more plug assemblies are mounted. The heating means arrangement shown in FIG. 1, however, is preferred since it provides improved temperature control of each individual assembly. Heater 26 has electrical leads 28 attached thereto which are connected to a suitable source of electric power (not shown). Further included in assembly 10 and in the embodiment shown, in shaft portion 12 of assembly 10, is means for sensing the temperature of the plug assembly which may for example, comprise a thermistor 30 inserted in another bore in shaft portion 12 and held therein by a suitable retainer 32. Thermistor 30 is connected by suitable electrical leads 34 to a suitable, conventional temperature control instrument (not shown). It is preferable to have the bores or other means for holding the heating and temperature sensing means of the plug assembly confined to shaft portion 12 to avoid alignment problems in changing from one plug to another.

Assembly 10 further comprises means for securing plug 18 to shaft portion 12 in a manner which permits the plug to be readily placed on and removed from shaft portion 12. These means may comprise, for example, one or more threaded members 36 joining plug 18 to shaft portion 12. These threaded members extend through plug 18 from its upper face and through the upper face 25 of shaft portion 12, to facilitate rapid replacement from above. It has been found that no undesirable imprint is left on the surface of the container being formed by the top face of a threaded member 36. Obviously other means may be used to secure the plug to the shaft portion, such as mating screw threads on each part. These, however, are expensive to initially form and are susceptible to rapid wear when frequent plug changes occur.

The shaft and plug portions of assembly 10 may be fabricated from a variety of materials such as metals e.g. steel, magnesium, copper etc. Aluminum is preferred because of its light weight and desirable heat conductivity properties. For unheated or neutral plug assemblies wood is a satisfactory material. When the plug assembly is made of metal such as aluminum, shaft portion 12 is generally treated to provide it with a hard exterior surface, particularly at the leading end which is inserted into the plug socket 20, in order to impart wear resistance to the part.

Figure 2:
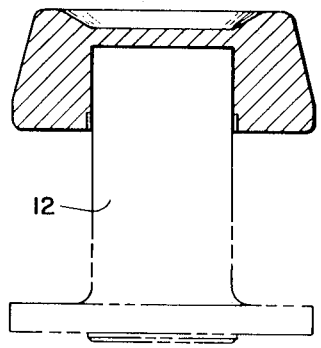
FIG. 2 is a schematic view similar to FIG. 1 of a plug assembly for producing a different sized container from that obtainable with the apparatus of FIG. 1.

In FIG. 2 is shown a plug assembly similar to that depicted in FIG. 1 except that the axial length of plug 38 is substantially shorter than that of FIG. 1 although the remaining overall configuration is the same. Thus, the only change necessary on the plug side of the sheet in a thermoforming station in changing from the production of a 16 oz. tub made with the assembly of FIG. 1 to an 8 oz. tub made with the assembly of FIG. 2 is to merely replace the plug of FIG. 1 with that of FIG. 2 on the common shaft portion 12. The wiring for the heater assembly and the sensing element and the bolting of the support flange need not be disturbed for the product change. The depth of the pocket in an axial direction of the plugs as well as the length of the cylindrical portion of the shaft portion is identical in FIGS. 1 and 2. Because of the unitary nature of the assembly, expansion of both the receptacle and plug occur simultaneously when made of metal, so that a plug though hot may be removed without difficulty from a shaft portion. A plug to be newly installed on a hot shaft portion, however, may have to be heated before it will snugly fit over the end of the shaft portion.

In FIG. 3 is generally depicted the manner of drawing a portion 40 of sheet material S into cavity 42 of mold 44 in an otherwise conventional manner. Mold 44 may be maintained at constant temperature by means of circulation of a cooling medium there through to set the thermoplastic after formation of the container. Suitable channels may be formed in mold 44 extending between the inner surface of the cavity and the exterior of the mold to permit venting of air in cavity 42 to the exterior as the plug advances into the cavity and pulls the sheet therein. Alternatively, air channels may be formed in the plug assembly to aid in obtaining optimum material distribution during plug travel by providing an escape vent channel 27 for air trapped between the plug and sheet when the plug has an idented upper end as shown in FIGS. 1 and 3. For other plug shapes this channel may be unnecessary.

After the container has been partially formed by means of an advancing plug a vacuum may be drawn on cavity 42 of the mold to finally form the container by snapping the partially formed article outwardly against the article defining surfaces of mold cavity 42. Air issuing from the plug side of the sheet may be utilized to assist in forcing the plastic outwardly against the cavity walls.

Figure 4:
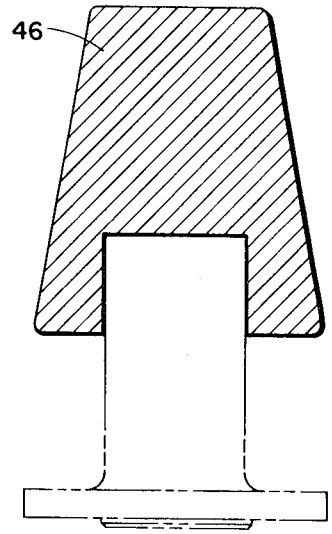
FIG. 4 is a view similar to FIG. 2 of a plug assembly for forming a container having a different shape from that obtainable with the apparatus of FIG. 1.

In FIG. 4 is depicted a mold assembly wherein the plug 12 is identical to that depicted in FIGS. 1 and 2, but wherein the container being formed is of a different shape, i.e. a beverage cup. As can be seen, plug 46 of the plug assembly in this case is substantially narrower in cylindrical dimensions and is more elongated in the direction of the draw or movement of the plug into the mold cavity.

The above description and particularly the drawings are set forth for purposes of illustration only and are not to be taken in a limited sense.

Though the shaft portion of the present invention has been shown with reference to a single container forming station, it should be understood that a plurality of like or different sized shaft portion may be mounted on a common base, thus greatly increasing the flexibility of the forming line to the extent that a number of different sizes and shapes of articles may be formed on a given line on any one occasion.

Obviously many variations may be made from the invention as previously described without departing from the overall spirit and scope of the invention.

What is claimed is:

1. A plug assembly for use in forming containers from thermoplastic sheet material comprising:
    (a) an elongated shaft portion adapted to selectively receive differently dimensioned plugs;
    (b) means extending into said shaft portion for heating said plug assembly; and
    (c) means for securing said plugs to said shaft portion.

2. The assembly of claim 1 including means in said shaft portion for sensing the temperature of said plug assembly.

3. A plug assembly for use in forming containers from thermoplastic sheet material comprising:
    (a) a reciprocatably mounted cylinder, elongated shaft portion adapted to selectively receive differently dimensioned plugs and having an axially extending bore therein;
    (b) a series of plugs, each of which is adapted to be removably mounted on said shaft portion to assist in forming a family of dimensionally related containers of differing volumetric capacities when successively used on said shaft portion, each of said plugs having substantially identical dimensions in the circumferential direction whereby to assist in establishing the dimensional relationship between containers of said family during forming, the length of each of said plugs in an axial direction being different from that of every other plug in said series whereby to assist in establishing the differing volumetric capacities between containers of said family during forming;

(c) a cartridge heater in the bore of said shaft portion for heating said forming plugs;

(d) means in said shaft portion for sensing the temperature of said plug assembly; and (e) means for securing each of said plugs to said shaft portion so that said plugs may be readily placed on and removed from said receptacle.

4. The assembly of claim 3 wherein the means for sensing the temperature of said plug assembly is a thermistor in a second bore in said shaft portion.

References Cited
UNITED STATES PATENTS

| | | | |
|---|---|---|---|
| 3,315,313 | 4/1967 | Steigman | 18—19 F UX |
| 3,338,997 | 8/1967 | Tigner | 18—19 |
| 3,342,914 | 9/1967 | Edwards | 18—19 |
| 3,357,053 | 12/1967 | Lyon et al. | 18—19 |
| 3,381,068 | 4/1968 | Leiper et al. | 18—19 |

WILLIAM S. LAWSON, Primary Examiner

L. GILDEN, Assistant Examiner